(12) United States Patent
MacGillivray

(10) Patent No.: US 10,444,597 B2
(45) Date of Patent: Oct. 15, 2019

(54) FREQUENCY-CONVERSION CRYSTAL FOR FEMTOSECOND-LASER PULSES

(71) Applicant: Coherent Scotland Limited, Glasgow (GB)

(72) Inventor: Ian MacGillivray, Glasgow (GB)

(73) Assignee: Coherent Scotland Limited, Glasgow (GB)

( * ) Notice: Subject to any disclaimer, the term of this patent is extended or adjusted under 35 U.S.C. 154(b) by 0 days.

(21) Appl. No.: 15/945,598

(22) Filed: Apr. 4, 2018

(65) Prior Publication Data
US 2018/0307117 A1 Oct. 25, 2018

(30) Foreign Application Priority Data
Apr. 19, 2017 (GB) .................................. 1706184.7

(51) Int. Cl.
*G02F 1/37* (2006.01)
*G02F 1/35* (2006.01)
*G02F 1/355* (2006.01)

(52) U.S. Cl.
CPC .............. *G02F 1/37* (2013.01); *G02F 1/3544* (2013.01); *G02F 1/3551* (2013.01); *G02F 2001/3509* (2013.01); *G02F 2001/3542* (2013.01)

(58) Field of Classification Search
CPC ........ G02F 1/3551; G02F 1/37; G02F 1/3544; G02F 2001/3509; G02F 2001/3542
See application file for complete search history.

(56) References Cited

U.S. PATENT DOCUMENTS

| 5,136,597 A | 8/1992 | Nightingale |
| 5,321,718 A * | 6/1994 | Waarts ....................... G02F 1/37 |
| | | 359/326 |
| 5,640,480 A | 6/1997 | Komine |
| 5,966,240 A | 10/1999 | Lange et al. |
| 6,590,911 B1 | 7/2003 | Spinelli et al. |
| 7,612,934 B2 * | 11/2009 | Bragg ....................... G02F 1/37 |
| | | 359/328 |

(Continued)

FOREIGN PATENT DOCUMENTS

| JP | 10-260438 A | 9/1998 |
| JP | 2002-287193 A | 10/2002 |
| WO | 2000/03293 A1 | 1/2000 |

OTHER PUBLICATIONS

N. A. Chaitanya, A. Aadhi, S. C. Kumar, M. V. Jabir, G. K. Samanta and M. Ebrahim-Zadeh, "Frequency-Doubling of Femtosecond Pulses in "Thick" Nonlinear Crystals With Different Temporal and Spatial Walk-Off Parameters," in IEEE Photonics Journal, vol. 8, No. 6, pp. 1-13, Dec. 2016, Art No. 6100613. (Year: 2016.*

(Continued)

*Primary Examiner* — Rhonda S Peace
(74) *Attorney, Agent, or Firm* — Morrison & Foerster LLP

(57) ABSTRACT

An optically nonlinear crystal is arranged for frequency-doubling an input pulse. The crystal has parallel facets each coated with a reflective coating. The crystal is arranged with respect to the input pulse such that the input pulse makes a plurality of forward and reverse passes between the coatings. A frequency-doubled pulse is generated on the forward passes. The input pulse and the frequency-doubled pulse propagate with different group velocities in the crystal such that temporal separation the pulses occurs. The crystal and reflective coatings are configured such that the temporal separation does not exceed a predetermined value.

20 Claims, 3 Drawing Sheets

(56) References Cited

U.S. PATENT DOCUMENTS

| | | | |
|---|---|---|---|
| 7,912,101 B2* | 3/2011 | Barnes | G02F 1/3501 372/101 |
| 8,068,274 B2* | 11/2011 | Mizushima | G02F 1/353 359/326 |
| 8,294,979 B2* | 10/2012 | Shikii | G02F 1/353 359/326 |
| 8,724,207 B1 | 5/2014 | Andrusyak et al. | |
| 2004/0240491 A1 | 12/2004 | Nebel et al. | |
| 2007/0002920 A1 | 1/2007 | Ishizu | |
| 2010/0060976 A1 | 3/2010 | Ebrahim-Zadeh et al. | |
| 2018/0307117 A1* | 10/2018 | MacGillivray | G02F 1/3551 |

OTHER PUBLICATIONS

Gallmann et al., "Generation of Sub-6-fs Blue Pulses by Frequency Doubling with Quasi-Phase-Matching Gratings", Optics Letters, vol. 26, No. 9, May 1, 2001, pp. 614-616.

Gehr et al., "Simultaneous Spatial and Temporal Walk-Off Compensation in Frequency-Doubling Femtosecond Pulses in $\beta$-BaB$_2$O$_4$", Optics Letters, vol. 23, No. 16, Aug. 15, 1998, pp. 1298-1300.

Huang et al., "Proposal of High Quality Walk-Off Compensated Sum Frequency Generation of Ultra-Short Pulses", Optics Communications, vol. 281, 2008, pp. 5244-5248.

International Search Report and Written Opinion received for PCT Patent Application No. PCT/GB2018/050804, dated Jun. 28, 2018, 14 pages.

Search and Examination Report received for Great Britain Patent Application No. GB1706184.7, dated Sep. 5, 2017, 8 pages.

Smith et al., "Increased Acceptance Bandwidths in Optical Frequency Conversion by Use of Multiple Walk-Off-Compensating Nonlinear Crystals", Journal of Optical Society of America, vol. 15, No. 1, Jan. 1998, pp. 122-141.

Search Report received for Great Britain Application No. GB1706184,7, dated Feb. 27, 2019, 2 pages.

\* cited by examiner

FREQUENCY-CONVERSION CRYSTAL FOR FEMTOSECOND-LASER PULSES

TECHNICAL FIELD OF THE INVENTION

The present invention relates in general to frequency conversion of laser-radiation in optically nonlinear crystals. The invention relates in particular to frequency conversion of laser-radiation in the form of pulses having a pulse-duration of about 600 femtoseconds (fs) or less.

DISCUSSION OF BACKGROUND ART

Frequency conversion in optically nonlinear crystals is typically used to generate laser-radiation at a wavelength shorter than that which can be generated directly as fundamental radiation in a particular laser type. One common frequency-conversion operation is generating radiation having a wavelength in the visible region of the electromagnetic spectrum from radiation having a having a wavelength in the near infrared (NIR) region of the electromagnetic spectrum.

By way of example, radiation from a laser having a fundamental wavelength of 1040 nanometers (nm) can be converted to radiation having a wavelength of 520 nm by second-harmonic generation (frequency-doubling) in an optically nonlinear crystal. The 520 nm radiation can be converted to shorter-wavelength radiation by further frequency-conversion steps. For example, frequency-doubling to provide radiation having a wavelength of 260 nm or third-harmonic generation by sum-frequency mixing the 520 nm radiation with the 1040 nm-radiation to provide radiation having a wavelength of about 347 nm.

A basic requirement of any frequency-conversion operation is that the beam of laser-radiation being frequency-converted and the beam of frequency-converted radiation both overlap and stay in phase for as long as possible within the optically nonlinear crystal. Cutting the crystal with a particular entrance-face angle with respect to the crystal axes is one way to keep the radiation beams in phase. This is usually referred to as "phase-matching" by practitioners of the art.

Optically nonlinear crystals are birefringent. The radiation being frequency-converted and the frequency-converted radiation are orthogonally polarized with respect to each other. Therefore, in a critical frequency-conversion arrangement, the radiation beams propagate at an angle to each other within the crystal. This divergence is typically referred to as "spatial walk-off" by practitioners of the art. The distance over which the radiation beams remain effectively overlapped depends on a particular crystal, a particular conversion operation, and the beam cross-section dimensions. Assuming the radiation being converted is either continuous-wave (CW) radiation or pulsed radiation having a pulse-duration of several picoseconds (ps) or greater, the beams can remain overlapped for distances of up to about 10 millimeters (mm) in the crystal. Two crystals can be arranged in series such that spatial walk-off in one crystal is at least partially compensated in the other. This is described in detail in U.S. Pat. No. 5,136,597, the complete disclosure of which is hereby incorporated by reference.

A problem arises when the laser-radiation being frequency converted is pulsed, having a pulse-duration of less than about a few hundred femtoseconds (fs). Pulses having a duration of between about 100 fs and about 200 fs are typically delivered by passively mode-locked fiber lasers. The wavelength being converted and the converted wavelength generally have different group velocities in the crystal, and the difference can be sufficient for pulses at the two different wavelengths to become temporally separated. This separation is typically referred to as "temporal walk-off" by practitioners of the art. The pulse being frequency converted may be faster than the frequency converted pulse or vice versa, depending again on a particular crystal and a particular conversion operation. Temporal walk-off limits the efficiency of frequency conversion and can distort the temporal pulse-shape of the frequency-converted radiation.

By way of example, in converting 1040 nm pulses to 520 nm pulses in lithium triborate (LBO), the inverse group velocity of the 1040 nm pulses (in the ordinary ray) is 5419.5 femtoseconds per millimeter (fs/mm). The inverse group velocity of the generated 520 nm pulses (in the extraordinary ray) is 5468.7 fs/mm. The difference between the inverse group velocities is 49.2 fs/mm, which means that a 1040 nm pulse and a corresponding 520 nm pulse will become temporally separated (at the half-peak intensity points) after propagating a distance of about 3 mm. This becomes essentially the maximum useful crystal length.

For such a short crystal, a high peak-intensity is required to obtain a useful conversion efficiency, about 10 Gigawatts per centimeter squared in the example. This is typically obtained by focusing a beam of radiation to be converted into a relatively small spot, having a diameter of about 100 micrometers ($\mu$m) in the example. Such a high peak-intensity, however, can lead to limited crystal lifetime. Crystal lifetime can be extended by using a crystal having relatively large lateral dimensions compared to the beam spot-size and shifting the crystal with respect to the beam, either periodically or continually. However, this requires precisely controllable translation stages, which add to apparatus cost.

Another relatively-elaborate approach to increasing conversion efficiency is to use multiple crystals arranged to compensate both temporal and spatial walk. Such an arrangement is describe in a paper "*Simultaneous spatial and temporal walk-off compensation in frequency-doubling femtosecond pulses in $\beta$-$BaB_2O_4$*", Gehr et al., Optics letters, Vol. 23, No. 16, Aug. 15, 1998. This involves five optically nonlinear crystals, with three thereof actively frequency-doubling, interspersed with two passive compensating crystals. The five crystals are arranged to provide spatial and temporal walk-off compensation.

There is a need for temporal walk-off compensation for frequency converting femtosecond laser pulses in an optically nonlinear crystal. Preferably, the temporal walk-off compensation should be achieved without using an additional crystal.

SUMMARY OF THE INVENTION

In one aspect of the present invention, optical apparatus for converting pulsed laser radiation having a first wavelength to pulsed laser-radiation having a second wavelength comprises an optically nonlinear crystal having first and second facets parallel to each other. First and second reflective coatings are provided, each thereof being highly reflective at the first and second wavelengths. The first reflective coating partially covers the first facet. The second reflective coating at least partially covers the second facet. The crystal and the reflective coatings are configured and arranged such that a pulse at the first wavelength enters the crystal through a portion of the first facet not covered by the first reflective coating. The pulse at the first wavelength makes at least one forward pass through the crystal and at least one reverse pass through the crystal. After the first forward pass, the subsequent passes are directed by the reflective coatings. The forward and reverse passes are at an angle to each other. A pulse at the second wavelength is generated from the first-wavelength pulse during the forward passes. There is a changing temporal separation between the first-wavelength pulse and the second-wavelength pulse while passing through the crystal. Reflection from at least one of the reflective coatings changes the temporal separation. The crystal and the reflective coatings are also configured to cooperatively minimize the temporal separation, such that the temporal separation does not exceed a tolerable value during the forward passes.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
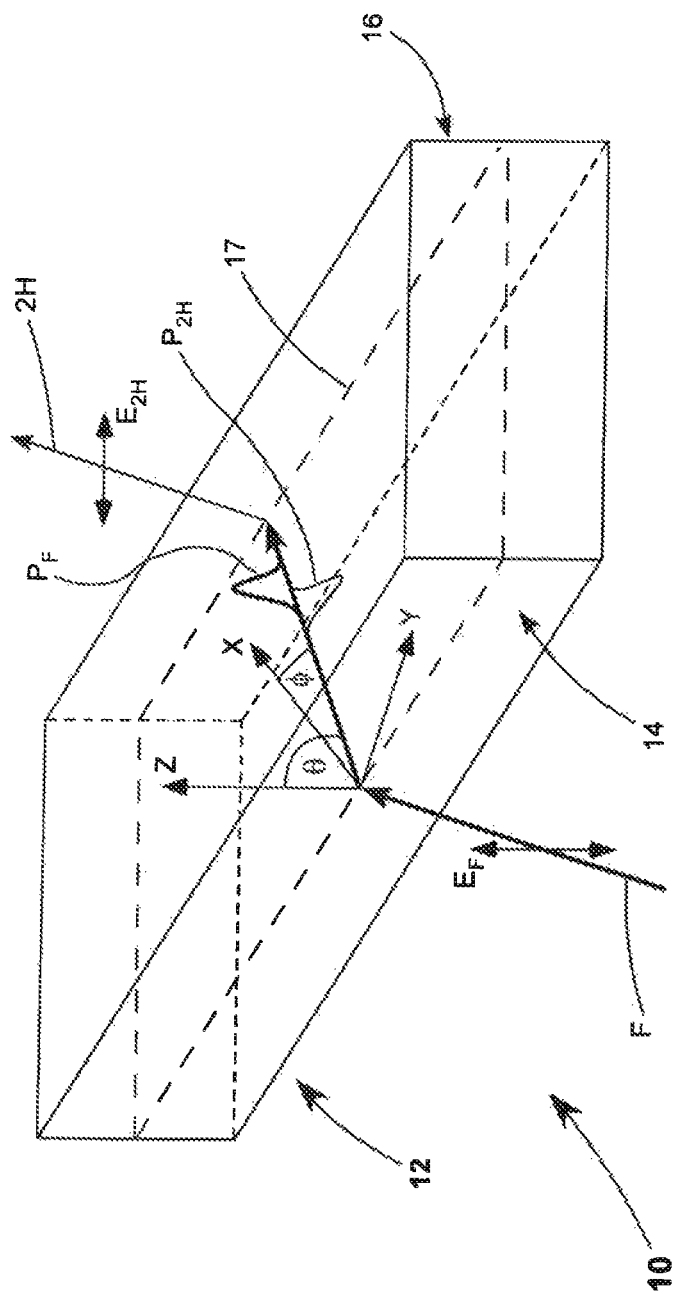
FIG. 1 is a three dimensional view schematically illustrating a prior-art arrangement for frequency-doubling of a very short pulse by a single pass through a Brewster-cut optically nonlinear crystal with type-I phase matching, with temporal separation of the pulse being frequency doubled and the resultant frequency-doubled pulse.

Turning now to the drawings, wherein like components are designated by like reference numerals, FIG. 1 schematically illustrates a prior-art arrangement 10 for frequency-doubling of a very short (few hundred femtoseconds) pulse by a single pass through a Brewster-cut optically nonlinear crystal 12 with type-I phase matching. Crystal 12 has opposite parallel entrance and exit facets 14 and 16, respectively. The crystal-axes X, Y, and Z are depicted with the X-Y plane bounded by a long-dashed line 17.

By way of example, for a lithium tri-borate (LBO) crystal arranged to convert a pulse have a wavelength of about 1040 nm to a pulse having a wavelength of about 520 nm, phase matching angles θ and ϕ are preferably 90° and 12.1°, respectively. Polarization-orientation $E_F$ of the 1040 nm (fundamental) pulse is parallel to facet 14. Polarization-orientation $E_{2H}$ of the 520 nm (second-harmonic) pulse is perpendicular to $E_F$. The angle of incidence of the fundamental pulse on entrance-facet 14 of crystal 12 is selected, cooperative with angles θ and ϕ, such that the generated second-harmonic pulse is incident on exit-facet 16 of the crystal at the Brewster angle (58.1° external in this example). Within the crystal, the fundamental and second-harmonic pulses $P_F$ and $P_{2H}$, respectively, are depicted separated by above-discussed temporal walk-off.

Calculations indicate that in this exemplary arrangement for a crystal 12 having a thickness of 3 mm, there would be a total temporal walk-off between the fundamental and second-harmonic pulses of 173.7 fs, with the fundamental pulse leading the second-harmonic pulse. As discussed above, for pulses having a duration of between about 100 fs and about 200 fs, this would result in a temporal separation of the pulses.

Figure 2:
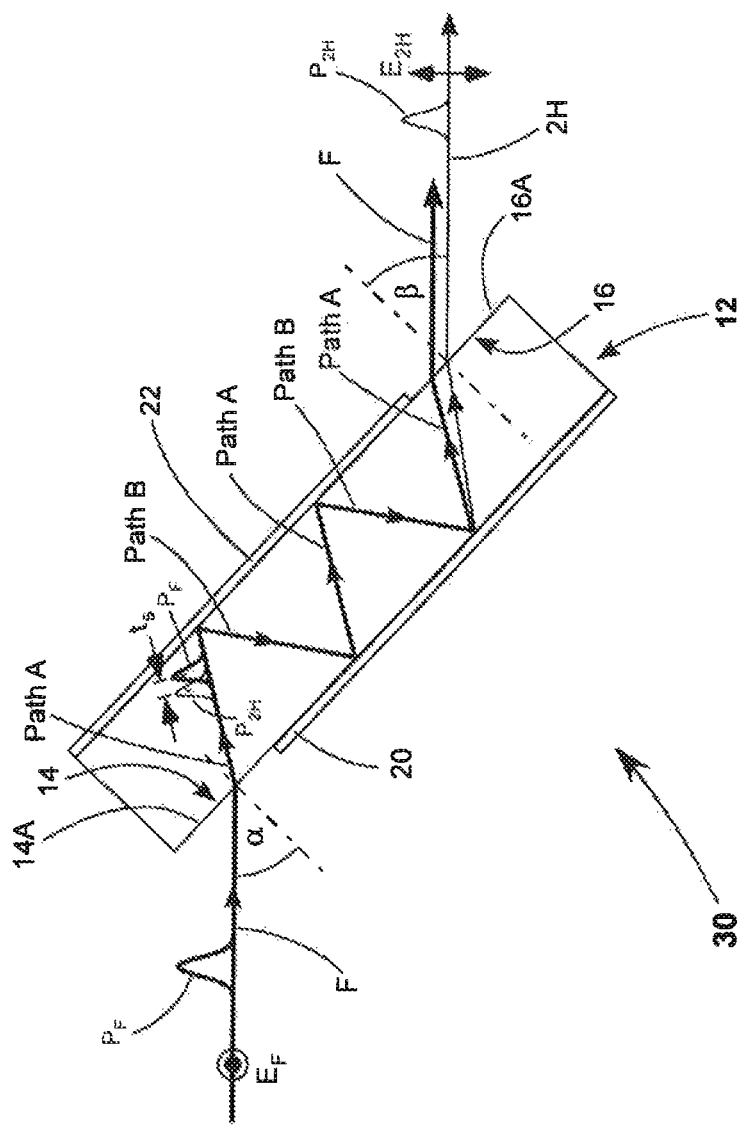
FIG. 2 schematically illustrates one preferred embodiment of the present invention in which the temporal separation of pulses is repeatedly reduced by a plurality of reflections of the pulses from highly reflective coatings on opposite entrance and exit surfaces of the crystal.

FIG. 2 schematically illustrates a preferred embodiment 30 of an arrangement in accordance with the present invention for frequency-doubling a very short pulse by type-I frequency conversion in an optically nonlinear crystal 12. Here, the crystal is assumed to be arranged and cut essentially as described above with reference to FIG. 1 to assist comparison of the inventive arrangement with the prior-art arrangement. Accordingly, the same reference numerals are used for the crystal and features thereof as are used in FIG. 1. Incidence angle α for fundamental radiation F, polarized in orientation $E_F$, is preferably selected such that incidence angle β for second-harmonic radiation 2H, polarized in orientation $E_{2H}$, is at the Brewster angle.

In embodiment 30, entrance and exit facets 14 and 16 are partially coated with reflective coatings 20 and 22, respectively. The coatings are highly reflective for the fundamental wavelength and the second-harmonic wavelength. The coatings are disposed on the respective facets such that fundamental radiation F (pulse $P_F$) is incident on a portion 14A of facet 14; enters crystal 12 at incidence angle α; is reflected from coating 22 onto coating 20; is reflected from coating 20 back to coating 22; is reflected again from coating 22 back to coating 20; and reflected from coating 20 out of crystal 12 via an uncoated portion 16A of facet 16. Portion 14A may be uncoated as depicted or furnished with an antireflection coating.

The forward path from facet 14 to facet 16 is designated here as Path A. The reverse path from facet 16 to facet 14 is designated here as Path B. The forward and reverse paths are at an angle to each other. Second-harmonic radiation is generated only during forward passes along Paths A, which are phase-matched paths. No second-harmonic radiation is generated during reverse passes along Paths B, as these paths are not at the correct phase-matching angle with respect to the crystal axes.

Temporal walk-off $t_s$ occurs on Paths A as illustrated by the separation between pulses $P_F$ and $P_{2H}$. This temporal separation changes as the pulses pass through the crystal due to the different group velocities thereof. A group delay accumulates during each forward pass through the crystal. Temporal walk-off also occurs on Paths B, however, the temporal walk-off on Paths B is generally different from the temporal walk-off on Paths A. In some crystals, for some fundamental and second-harmonic wavelengths, the temporal walk-off in the forward and reverse paths may be opposite.

Coatings 20 and 22 are designed to introduce sufficient group delay between the fundamental and second-harmonic radiation that the net temporal walk-off between the fundamental and second-harmonic pulses is kept at or below some predetermined tolerable value during the forward passes through the crystal. One preferred tolerable value of net temporal walk-off is about the pulse-duration of pulse $P_F$ measured between the two half-maximum intensity points of the pulse, generally referred to by practitioners of the art as the full-width at half-maximum (FWHM) pulse-duration. Both high-reflectivity and controlled group delay can be achieved using multi-layer thin-film dielectric coatings. The temporal separation between pulses $P_F$ and $P_{2H}$ is changed during reflection by a fixed amount due to different penetration depths of the pulses into a multi-layer coating.

It should be noted here that pulses $P_F$ and $P_{2H}$ are depicted in FIG. 2 physically shorter than in practice, for convenience of illustration. By way of example, a pulse having a duration of 150 fs would have a corresponding physical length of about 45 mm.

It should be noted also that the path of second-harmonic radiation relative to that of the fundamental radiation (the spatial walk-off angle) is depicted in FIG. 2, for simplicity of illustration, only on the final reflection from coating 20. Those skilled in the art will recognize that, in practice, the second-harmonic radiation is generated at the walk-off angle along all of the phase-matched Paths A. The angular separation continues along the Paths B. A result of this walk-off is that the second-harmonic radiation beam will become progressively more elliptical in cross-section with progress in the crystal.

The inventive approach to very short-pulse harmonic generation is next described in terms of a numerical example. This approach would be applicable for any frequency-conversion operation, in any particular optically nonlinear crystal material.

First, it is necessary to decide on a maximum tolerable group delay during any of the phase-matched forward passes (along Paths A in FIG. 2). By way of example, this could be a group delay equal to about the FWHM pulse-duration of a fundamental pulse. The tolerable group delay can be used to determine a suitable crystal thickness. Then, the forward and reverse group delay between the radiation being frequency converted and the converted radiation can be calculated from the properties of whatever optically nonlinear crystal is selected and whatever phase-matching arrangement is selected.

Next, the reflective coatings (coatings 20 and 22 in FIG. 2) are specified such that the crystal and the reflective coatings cooperatively minimize the temporal separation, such that the temporal separation does not exceed the tolerable group delay during the forward passes. Finally, it can be determined how many phase-matched paths will be required. The number of paths could be determined according to the fundamental beam cross-section dimensions and the accumulated spatial walk-off. This number will determine a minimum length of the crystal.

In the above-discussed example of frequency-doubling a 1040 nm pulse having a FWHM pulse-duration of about 150 fs by type-I phase-matching in a Brewster-cut LBO crystal, a crystal thickness of 3 mm would lead to a temporal walk-off (group delay) along one Path A of +173.7 fs. The positive sign of the temporal walk-off indicates that the 1040 nm pulse being converted would lead a generated 520 nm pulse at the first incidence on facet 16 of crystal 12. A reverse pass along one Path B would introduce a temporal walk-off of −161.0 fs. Accordingly, if reflection from coating 22 did not introduce any additional group delay, the net temporal walk-off would be +12.7 fs.

If it were desired that the 1040 nm pulse and the 520 nm pulse be exactly re-synchronized (have zero temporal walk-off) following reflection from coating 20 along a second Path A, then coatings 20 and 22 together must provide a net group delay of −12.7 fs. This net group delay could be provided by any combination of individual group delays for the two coatings. Here it should be noted that it is extremely unlikely that a coating specified to have high reflectivity at such a high incidence angle, and with different polarization-orientations for the two wavelengths, would not introduce any group delay unless that were specified and part of the coating design. For example, a coating specified to have 99% or greater reflectivity at both 1040 nm and 520 nm at an internal angle-of-incidence of about 32° in the exemplary LBO crystal.

By building the appropriate group delay into coatings 20 and 22, the 1040 nm and 520 nm pulses can be re-synchronized following each reflection from coating 20. For example, the temporal separation could be zero at the beginning of each forward pass along Path A. Alternatively, the temporal separation could be zero at about a mid-point along Path A. This re-synchronization would provide that the temporal walk-off between the 1040 nm and 520 nm pulses never exceeded the tolerable value during any forward pass through crystal 12. Group delay accumulated during each forward pass would be reduced by an opposite group delay induced by a combination of the next reverse pass and reflections from the first and second reflective coatings.

The inventive arrangement as depicted in FIG. 2 would provide three times the interaction length of a prior-art single-pass crystal of the same thickness that is similarly cut and has the same temporal walk-off. An advantage of the inventive arrangement is that the longer interaction length would allow for a reduction in the intensity of the fundamental beam, increasing the crystal lifetime and in some cases eliminating need for a crystal translation stage.

Figure 3:
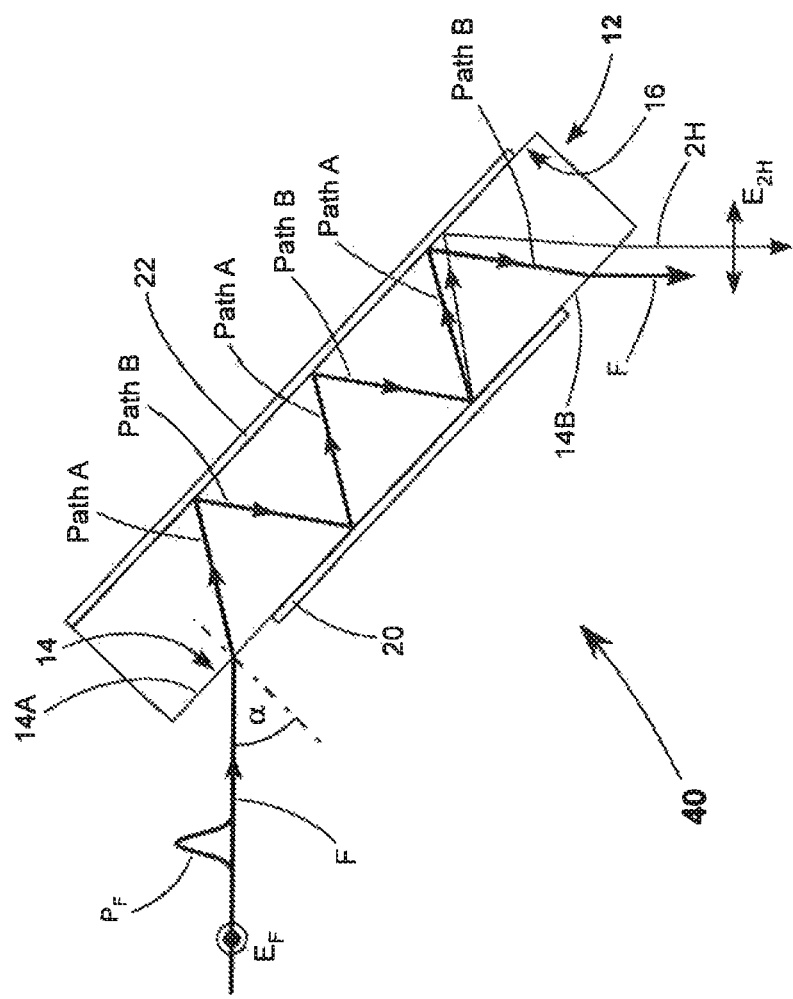
FIG. 3 schematically illustrates another preferred embodiment of the present invention, similar to the embodiment of FIG. 2, but wherein pulses enter and leave the crystal via the same surface.

If in the arrangement of FIG. 2 it were desired to re-synchronize the fundamental and second-harmonic pulses exiting the crystal, for example, for generating sum-frequency radiation in another frequency-conversion operation, this would require one or more additional birefringent elements. FIG. 3 schematically illustrates another preferred embodiment 40 of the present invention in which temporal synchronization of exiting fundamental and second-harmonic pulses can be achieved inherently.

The arrangement of embodiment 40 is similar to the arrangement of embodiment 30, with an exception that fundamental pulses enter and generated second-harmonic pulses and residual fundamental pulses exit crystal 12 via the same facet, here, facet 14. This is achieved in the example of FIG. 3 by extending the length of crystal 12, extending coating 22 to cover all of facet 16, and arranging coating 20 to leave uncoated portions 14A and 14B on facet 14. This allows for one additional Path B along which the temporal re-synchronization can be effected. If exact synchronization of the pulses exiting the crystal is desired, then coatings 20 and 22 should be designed such all residual temporal walkoff, i.e., that temporal walk-off not corrected by forward and reverse passes in the crystal alone, is corrected by coating 22 only, with coating 20 designed not to introduce any group delay between the fundamental and second-harmonic pulses. In this way, the temporal separation would be reduced to zero at the end of each reverse pass.

Regarding reflective coatings 20 and 22, design principles for coatings having specific reflection properties combined with specific group-delay properties have been described in patent and open literature references over the past several years. Custom design and deposition of such coatings is commercially available. One supplier of user-specified group-delay controlled coatings is LaserOptik GmbH of Garbsen, Germany.

It should be noted here that the present invention is described above with reference to a type-I critical frequency-doubling (second-harmonic generating) operation. Those skilled in the art will recognize from the description of the present invention presented herein, that the invention is applicable to other frequency-conversion operations, such as sum-frequency operations and to type-0 and type-II frequency-conversion operations. The invention is also applicable to optical parametric generation (frequency-division) operations. Those skilled in the art will also recognize that embodiments of the present invention may be combined in groups of two or more for multi-step frequency-conversion, or for spatial (angular) walk-off compensation.

In summary, the present invention is described above with reference to two preferred embodiments. The invention is not limited, however, to embodiments described and depicted herein. Rather the invention is limited only by the claims appended hereto.

What is claimed is:

1. Optical apparatus for converting pulsed laser-radiation having a first wavelength to pulsed laser-radiation having a second wavelength, the apparatus comprising:
   an optically nonlinear crystal having first and second facets parallel to each other; and
   first and second reflective coatings, each thereof being highly reflective at the first and second wavelengths, the first reflective coating partially covering the first facet and the second reflective coating at least partially covering the second facet;
   wherein the crystal and the reflective coatings are configured and arranged such that a pulse at the first wavelength enters the crystal through a portion of the first facet not covered by the first reflective coating, makes at least one forward pass through the crystal and at least one reverse pass through the crystal, after the first forward pass the subsequent passes are directed by the reflective coatings, the forward and reverse passes at an angle to each other;
   wherein a pulse at the second wavelength is generated from the first-wavelength pulse during the forward passes;
   wherein there is a changing temporal separation between the first-wavelength pulse and the second-wavelength pulse while passing through the crystal due to the different group velocities thereof;
   wherein reflection from at least one of the reflective coatings induces a group delay between the first and second wavelengths that changes the temporal separation between the first-wavelength pulse and the second-wavelength pulse, the crystal and the group delay induced by the reflective coatings are also configured to cooperatively minimize the temporal separation such that the temporal separation does not exceed a predetermined value during the forward passes.

2. The apparatus of claim 1, wherein the predetermined value for the temporal separation during the forward passes is equal to the full-width at half-maximum pulse-duration of the first-wavelength pulse.

3. The apparatus of claim 1, wherein the group delay induced by the crystal and the reflective coatings is selected such that the temporal separation is zero at the beginning of each forward pass.

4. The apparatus of claim 1, wherein the group delay induced by the crystal and the reflective coatings is selected such that the temporal separation is about zero at a mid-point along each forward pass.

5. The apparatus of claim 1, wherein the number of forward passes is greater than the number of reverse passes by one, the second-wavelength pulse exits the crystal through a portion of the second facet not covered by the second reflective coating.

6. The apparatus of claim 5, wherein there are three forward passes and two reverse passes.

7. The apparatus of claim 1, wherein the number of forward passes equals the number of reverse passes, the second-wavelength pulse exiting the crystal through a second portion of the first facet not covered by the first reflective coating.

8. The apparatus of claim 7, wherein there are two forward passes and two reverse passes.

9. The apparatus of claim 1, wherein the group delay induced by the crystal and the coatings is selected such that the temporal separation is zero at the end of each reverse pass.

10. The apparatus of claim 1, wherein the first-wavelength pulse has a wavelength twice that of the second-wavelength pulse.

11. The apparatus of claim 10, wherein the first wavelength is about 1040 nanometers and the second wavelength is 520 nanometers.

12. The apparatus of claim 1, wherein the crystal is lithium tri-borate (LBO).

13. Optical apparatus for converting pulsed laser-radiation having a first wavelength to pulsed laser-radiation having a second wavelength, the apparatus comprising:
    an optically nonlinear crystal having first and second facets parallel to each other; and
    first and second reflective coatings, each thereof being highly reflective at the first and second wavelengths, the first reflective coating partially covering the first facet and the second reflective coating at least partially covering the second facet;
    wherein the crystal and the reflective coatings are configured and arranged such that a pulse at the first wavelength enters the crystal through a portion of the first facet not covered by the first reflective coating, makes at least one forward pass through the crystal and at least one reverse pass through the crystal, after the first forward pass the subsequent passes are directed by the reflective coatings, the forward and reverse passes at an angle to each other;
    wherein a pulse at the second wavelength is generated from the first-wavelength pulse during the forward passes;
    wherein there is an increasing temporal separation between the first-wavelength pulse and the second-wavelength pulse during each forward pass through the crystal due to the different group velocities thereof;
    wherein the temporal separation between the first-wavelength pulse and the second-wavelength pulse created during each forward pass is reduced by an opposite group delay induced by a combination of a subsequent reverse pass through the crystal and reflections from the first and second reflective coatings.

14. The apparatus of claim 13, wherein the group delay induced by the crystal and the reflective coatings is selected such that the temporal separation is zero at the beginning of each forward pass.

15. The apparatus of claim 13, wherein the group delay induced by the crystal and the reflective coatings is selected such that the temporal separation is zero at about a mid-point along each forward pass.

16. The apparatus of claim 13, wherein the crystal is Brewster cut such that the second-wavelength pulse exits the crystal through one of the facets at the Brewster angle for the second wavelength.

17. The apparatus of claim 13, wherein the first-wavelength pulse has a wavelength twice that of the second-wavelength pulse.

18. The apparatus of claim 17, wherein the first wavelength is about 1040 nanometers and the second wavelength is 520 nanometers.

19. The apparatus of claim 13, wherein the crystal is lithium tri-borate (LBO).

20. The apparatus of claim 13, wherein the reflective coatings are multi-layer thin-film dielectric coatings.

* * * * *